United States Patent
Kawasaki (10) Patent No.: US 11,207,656 B2
(45) Date of Patent: Dec. 28, 2021

(54) PARTICLE CONTROL METHOD

(71) Applicant: AIREX CO., LTD., Aichi (JP)

(72) Inventor: Koji Kawasaki, Aichi (JP)

(73) Assignee: AIREX CO., LTD

( * ) Notice: Subject to any disclaimer, the term of this patent is extended or adjusted under 35 U.S.C. 154(b) by 79 days.

(21) Appl. No.: 16/912,380

(22) Filed: Jun. 25, 2020

(65) Prior Publication Data

US 2020/0324266 A1    Oct. 15, 2020

Related U.S. Application Data

(63) Continuation of application No. 15/573,422, filed as application No. PCT/JP2016/063894 on May 10, 2016, now Pat. No. 10,744,478.

(30) Foreign Application Priority Data

May 13, 2015    (JP) ................................ 2015-097821

(51) Int. Cl.
*B01D 50/00* (2006.01)
*B01J 19/10* (2006.01)
(Continued)

(52) U.S. Cl.
CPC ............ *B01J 19/10* (2013.01); *B01D 49/006* (2013.01); *B01J 19/0006* (2013.01); *B03C 3/36* (2013.01);
(Continued)

(58) Field of Classification Search
CPC ..... B01J 19/10; B01J 19/0006; B01D 49/006; B03C 3/36; G01N 15/06; G01N 15/14;
(Continued)

(56) References Cited

U.S. PATENT DOCUMENTS

2006/0021437 A1*  2/2006  Kaduchak ............. B01D 21/28
                                                       73/570.5
2009/0029870 A1*  1/2009  Ward ................... G01N 29/222
                                                       506/9
(Continued)

*Primary Examiner* — Dung H Bui
(74) *Attorney, Agent, or Firm* — Quarles & Brady LLP; Yakov S. Sidorin

(57) ABSTRACT

A particle control method configured prevent an extremely small quantity of particles descending on a stream of a laminar flow in a clean zone through which the laminar flow flows (as in a RABS or isolator device) from descending to a specific position or to guide the particles so as to have them descend to a specific position by controlling movement of the particles.

[Solution]

A particle descent position is separated away from a board surface of the oscillation board by using an acoustic radiation pressure generated by prompting ultrasonic vibration of the oscillation board disposed with a board surface substantially in parallel with a flow direction of the laminar flow. Moreover, by using a node of a standing wave field generated by prompting the ultrasonic vibration of two oscillation boards disposed with the board surfaces faced with each other, the particle is guided to a direction of a node of a standing wave field. Moreover, by using a focal point of the ultrasonic wave generated by prompting the ultrasonic wave of four oscillation boards, that is, two pairs disposed with the board surfaces faced with each other, the particle is guided to the focal point of the ultrasonic wave.

6 Claims, 8 Drawing Sheets

(51) Int. Cl.
  *B01D 49/00* (2006.01)
  *G01N 15/14* (2006.01)
  *G01N 15/06* (2006.01)
  *B01J 19/00* (2006.01)
  *B03C 3/36* (2006.01)
  *G01N 15/00* (2006.01)
  *G01N 1/00* (2006.01)

(52) U.S. Cl.
  CPC ............ *G01N 15/06* (2013.01); *G01N 15/14* (2013.01); *G01N 2001/002* (2013.01); *G01N 2015/0046* (2013.01); *G01N 2015/0088* (2013.01); *G01N 2015/142* (2013.01); *G01N 2015/1415* (2013.01)

(58) Field of Classification Search
  CPC ..... G01N 2001/002; G01N 2015/0046; G01N 2015/0088; G01N 2015/1415; G01N 2015/142; F24F 3/167
  See application file for complete search history.

(56) References Cited

U.S. PATENT DOCUMENTS

| | | | |
|---|---|---|---|
| 2009/0158823 A1* | 6/2009 | Kaduchak | B01L 3/502761 73/61.75 |
| 2009/0178716 A1* | 7/2009 | Kaduchak | G01N 15/1404 137/13 |
| 2011/0134426 A1* | 6/2011 | Kaduchak | G01N 21/453 356/337 |
| 2013/0214176 A1* | 8/2013 | Graves | G01N 15/1404 250/459.1 |
| 2014/0147860 A1* | 5/2014 | Kaduchak | G01N 15/1404 435/7.21 |

* cited by examiner

PARTICLE CONTROL METHOD

CROSS-REFERENCE TO RELATED APPLICATIONS

This patent application is a continuation from the U.S. patent application Ser. No. 15/573,422 filed on Nov. 10, 2017 and now published as US 2018/0099259, which is a US national phase of PCT/JP2016/063894 filed on May 10, 2016, which in turn claims priority from the Japanese Patent Application JP 2015-097821 filed on May 13, 2015. The disclosure of each of the above-identified patent applications is incorporated herein by reference.

TECHNICAL FIELD

The present invention relates to a particle control method used in a clean environment such as a clean room, an isolator device and the like. More particularly, the present invention relates to a particle control method for controlling movement of an extremely small quantity of floating particles or bacteria contained in such particles in these clean environments.

BACKGROUND

Work performed in a clean atmosphere (such as work at a manufacturing stage of semiconductors or electronic components or work at a manufacturing stage of pharmaceutical products) is performed in a clean work environment, in which an inside of the environment is kept in a dust-free/sterile state so that contaminants do not enter from an external environment. As such clean environment, clean rooms are generally used. In a clean room, a worker wearing a dust-free clothes performs the work. However, in order to improve dust-free guarantee standards and sterile guarantee standards, work is performed by constructing a more highly clean zone in the clean room.

As a method of constructing a highly clean zone, RABS (restricted-access barrier system) is used. In the RABS, a zone surrounded by wall surfaces (with a lower part or side of the walls open) is provided in a part of the clean room, and a laminar flow of clean air (hereinafter referred to as a "laminar flow") in a unidirectional air flow flowing from an upper side to a lower side is made to flow therein and strict access restriction is set for workers. In this RABS, a worker performs work inside through a glove or half-suit provided on the wall surface. Moreover, as another method constituting the highly clean zone, an isolator device is used. With this isolator device, a chamber sealed from an external environment is used, and a worker performs work from an outside of this chamber through the glove or half-suit.

Inside the RABS or isolator device, the laminar flow flows through an HEPA filter or the like to the lower side from a clean air supply device provided on the upper side. With the RABS or isolator device, since a worker does not enter therein in order to perform a work, a clean zone in a highly dust-free/sterile state can be ensured. However, even if this clean zone guarantees Grade A (Guidance on the Manufacture of Sterile Pharmaceutical Products by Ministry of Health, Labour and Welfare) required for the manufacture of pharmaceutical products, it is likely that particles having a grain size of 0.5 μm or more (hereinafter, referred to as "particle" or "particles") are contained with concentration of up to 3520 particles/m$^3$ as an upper limit. These particles descend from the upper side to the lower side though the clean zone on the stream of the laminar flow. Moreover, these particles also contain bacteria floating in the air.

In such a clean zone, a filling work of pharmaceutical products or the like is performed, for example. In the filling work of the pharmaceutical products, containers such as vials (whose outer surfaces and insides are sterilized) are conveyed to a filling machine while traveling along a conveyer or a guider. Then, the container filled with the pharmaceutical products is sealed, whereby sterile filling should be completed. However, since the container before filling is traveling toward the filing machine through the clean zone with its opening portion (filling port) directed upward, it is likely that the extremely small quantity of particles (including floating bacteria) descending on the stream of the laminar flow are mixed into the container before filling.

As a method against this, further upgrading of the dust-free/sterile state in the clean zone can be considered. However, it is actually difficult to perform a filling work of pharmaceutical products by further upgrading the dust-free/sterile state of the inside of the RABS or isolator device.

Thus, various measures have been taken in the sterile filling device for excluding the extremely small quantity of particles in these clean zones as much as possible. In a sterile filling method proposed in Patent Literature 1 described below, for example, a container whose inside is sealed and sterilized in advance is used. Such container is connected to a specific filling device, and the pharmaceutical products are filled therein by inserting a nozzle into the container. Subsequently, the container is sealed still in the state where the pharmaceutical product in the container is not exposed to the outside air.

CITATION LIST

Patent Literature 1: Japanese Patent Laid-Open No. 2003-104320

Technical Problem

According to the sterile filling method proposed in Patent Literature 1 described above, productive sterile filling is considered to be possible without using a sterile chamber and a sterile device. Moreover, in this sterile filling method, since there is no exposure to the air in the clean zone, the particles in the air are not mixed into the container. However, the proposed method requires a special filing device, and containers that can be used are limited. Furthermore, pharmaceutical products (which can be handled by such special devices and special containers) are limited, and diversified pharmaceutical products including liquid, powder, and particles and the containers having various shapes corresponding to them cannot be used.

Therefore, when a general-purpose filing device that can be used for diversified pharmaceutical products and containers having various shapes corresponding to them is to be used in the RABS or isolator device, there remains a problem that the extremely small quantity of particles descending on the stream of the laminar flow in these clean zones cannot be excluded.

On the other hand, the dust-free/sterile state inside the RABS or isolator device is monitored by a particle counter or a flowing bacteria counter. These counters suck in a certain amount of air in the clean zone as a sample through a capturing port and detect the particles or floating bacteria in it with an optical measuring instrument or the like. Particularly, recently, the floating bacteria counter using the optical measuring instrument can drastically improve work efficiency as Rapid Microbiological Methods (RMM) as compared with a prior-art culturing method.

However, in the clean zone of the RABS or isolator device, the extremely small quantity of particles (including floating bacteria) descend linearly on the stream of the laminar flow, and the sampled air sucked through the capturing port of the counter mainly contains air from the environment located immediately above the capturing port, and there exists a problem that the entire clean zone cannot be monitored.

Thus, the present invention has an object of providing a particle control method which can prevent the extremely small quantity of particles descending on the stream of the laminar flow in the clean zone through which the laminar flow flows as in the RABS or isolator device from descending to a specific position or can guide it so as to descend to the specific position by controlling the movement of the particles in order to solve the aforementioned problem.

Solution to Problem

In solving the aforementioned problems, the inventors have found that movement of the extremely small quantity of particles descending on the stream of the laminar flow can be controlled by prompting ultrasonic vibration of an oscillation board disposed in the clean zone through which the laminar flow flows as the result of keen examination and completed the present invention.

That is, a particle control method according to the present invention is characterized in that in a clean zone, through which air in unidirectional air flow flows from an upper side toward a lower side in a work chamber, an oscillation board, the surface thereof is disposed substantially in parallel with a flow direction of the unidirectional air flow is subjected to ultrasonic vibration so as to oscillate an ultrasonic wave in a perpendicular direction from the board surface and in a direction crossing the flow direction of the unidirectional air flow; and the ultrasonic wave is made to act on particles made to flow by the air in the unidirectional air flow and descending from the upper side toward the lower side so that the descent position is controlled.

Moreover, the present invention includes the particle control method characterized in that the oscillation board has its board surface disposed on only one surface substantially in parallel with the flow direction of the unidirectional air flow in the clean zone;

the oscillation board is subjected to ultrasonic vibration so as to generate an acoustic flow by the ultrasonic wave in the perpendicular direction from the board surface and in the direction crossing the flow direction of the unidirectional air flow;

the particles made to flow by the air in the unidirectional air flow and descending from the upper side to the lower side is subjected to a pressing force by an acoustic radiation pressure so that its descent position is controlled in a direction away from the board surface of the oscillation board.

Moreover, the present invention includes the particle control method characterized in that a distance separating away from the board surface is changed by changing an output of the ultrasonic vibration of the oscillation board, and the particle descent position is controlled in an arbitrary direction.

Moreover, the present invention includes the particle control method being a method of preventing the descending particle from being mixed in opening portions of a plurality of containers continuously traveling in the clean zone and having upper sides open, wherein the board surface of the oscillation board is disposed substantially in parallel with a traveling direction of the plurality of containers so that the particle descent position is controlled so as to be at a position beyond the opening portion of the container from the board surface.

Moreover, the present invention includes the particle control method characterized in that in the clean zone, the oscillation board includes a pair of oscillation board and reflection board or two oscillation boards having their board surfaces faced with each other substantially in parallel with the flow direction of the unidirectional air flow; and by prompting ultrasonic vibration of the oscillation boards, a standing wave field by the ultrasonic wave is generated in the perpendicular direction from each of the board surfaces and in a direction crossing the flow direction of the unidirectional air flow, the particles made to flow by the air in the unidirectional air flow and descending from the upper side toward the lower side is subjected to the ultrasonic wave and the particles are guided to a direction of a node of the standing wave field so that the descent position is controlled to below a position of the node of the standing wave field.

Moreover, the present invention includes the particle control method characterized in that in the clean zone, the oscillation board includes a plurality of pairs of oscillation boards having two oscillation boards with the board surfaces faced with each other substantially in parallel with a flow direction of the unidirectional air flow are disposed in a horizontal direction with a changed angle; and by prompting ultrasonic vibration of the oscillation boards, a focal point of an ultrasonic wave is generated in the perpendicular direction from each of the board surfaces and in a direction crossing the flow direction of the unidirectional air flow, the particles made to flow by the air in the unidirectional air flow and descending from the upper side toward the lower side is subjected to the ultrasonic wave, and the particles are guided to the focal point of the ultrasonic wave so that the descent position is controlled to below a position of the focal point of the ultrasonic wave.

Moreover, the present invention includes the particle control method characterized in that by relatively changing an output of the ultrasonic vibration of each of the oscillation boards, the position of the node of the standing wave field or a position of the focal point of the ultrasonic wave is changed so that the particle descent position is controlled to move in an arbitrary direction.

Moreover, the present invention includes the particle control method that is a method used for measuring an amount of particles descending through the clean zone or floating bacteria contained in them, characterized in that below a position of a node of the standing wave field or below a position of a focal point of the ultrasonic wave, a capturing port of the particle counter or floating bacteria counter is opened, and control is executed such that the descending particles or floating bacteria contained in them are guided to the capturing port.

Advantageous Effects of Invention

According to the aforementioned configuration, in the particle control method according to the present invention, the board surface of the oscillation board is disposed substantially in parallel with the flow direction of the unidirectional air flow from the upper side toward the lower side in the work chamber. Then, this oscillation board is subjected to ultrasonic vibration so as to generate an acoustic flow by the ultrasonic wave. This acoustic flow is generated in the perpendicular direction from the board surface of the oscillation board and is generated in the direction crossing the flow direction of the unidirectional air flow. The acoustic flow generated as above gives a pressing force by the acoustic radiation pressure to the particles made to flow by the unidirectional air flow and descending from the upper side toward the lower side. As a result, the descent position of the particles can be controlled in the direction away from the board surface of the oscillation board.

Moreover, according to the aforementioned configuration, the output of the ultrasonic vibration of the oscillation board may be changed. As a result, the distance of the particles away from the board surface is changed, and the descent position can be controlled to an arbitrary direction.

Moreover, according to the aforementioned configuration, the board surface of the oscillation board is disposed substantially in parallel with the traveling direction of the plurality of containers traveling continuously in the clean zone. Subsequently, this oscillation board is subjected to the ultrasonic vibration so as to generate the acoustic flow by the ultrasonic wave, and the pressing force by the acoustic radiation pressure is given to the particles. As a result, even if the opening portions of the plurality of traveling containers are directed upward, control can be executed so that the descending particles are not mixed into the container.

Moreover, according to the aforementioned configuration, in the particle control method according to the present invention, a pair of oscillation board and reflection board is disposed so that their board surfaces are faced with each other substantially in parallel with the flow direction of the unidirectional air flow from the upper side toward the lower side in the work chamber. Subsequently, the oscillation board is vibrated by the ultrasonic wave so as to generate the standing wave field by the ultrasonic wave. This standing wave field is generated in the perpendicular direction from the board surfaces of the oscillation board and the reflection board and is generated in the direction crossing the flow direction of the unidirectional air flow. In the standing wave field generated as above, a node of the standing wave field is formed by sound pressure distribution, and the particles descending from the upper side toward the lower side are guided in the direction of the nodes of the standing wave field. As a result, the descent position of the particles can be controlled to below the position of the node of the standing wave field. Instead of the pair of oscillation board and reflection board, two oscillation boards may be used.

Moreover, according to the aforementioned configuration, in the particle control method according to the present invention, two pairs of, that is, four units of oscillation boards are disposed with the board surfaces of each pair faced with each other, for example, substantially in parallel with the flow direction of the unidirectional air flow flowing from the upper side toward the lower side in the work chamber. Subsequently, these oscillation boards are subjected to ultrasonic vibration so as to generate an ultrasonic focal point. This ultrasonic focal point is generated in the perpendicular direction from the board surface of the oscillation board and is generated in the direction crossing the flow direction of the unidirectional air flow. The particles descending from the upper side toward the lower side are guided in the direction of this ultrasonic focal point. As a result, the descent position of the particles can be controlled to below the position of the ultrasonic focal point. Instead of the two pairs of, that is, four oscillation boards, three or more pairs of oscillation boards may be disposed in plural pairs with angles changed in the horizontal direction.

Moreover, according to the aforementioned configuration, an output of the ultrasonic vibration of each oscillation board may be relatively changed. As a result, the position of the node of the standing wave field or the position of the ultrasonic focal point is changed, and the descent position of the particles can be controlled to an arbitrary direction.

Moreover, according to the aforementioned configuration, a capturing port of the particle counter or the floating bacteria counter for measuring the quantity of the particles descending through the clean zone or of the floating bacteria contained in them is disposed below the position of the node of the standing wave field or below the position of the ultrasonic focal point. Subsequently, each of the oscillation boards is subjected to the ultrasonic vibration so as to generate the node of the standing wave field or the ultrasonic focal point and the particles or the floating bacteria contained in them are guided to the node of the standing wave field or the ultrasonic focal point. As a result, control can be executed such that the particles descending linearly through the clean zone or the floating bacteria contained in them can be efficiently captured through the capturing port.

Thus, according to the aforementioned configuration, by controlling movement of the extremely small quantity of particles descending on the stream of the laminar flow through the clean zone through which the laminar flow is flowing as in the RABS or isolator device, the particle control method which can prevent descent at a specific position or can guide it so as to descend to the specific position can be provided.

BRIEF DESCRIPTION OF THE DRAWINGS

FIG. 1 is a schematic perspective view illustrating a positional relationship between an oscillation board and a container for filling in a clean zone in a first embodiment.

FIG. 2 is a schematic plan view of the oscillation board in the clean zone in FIG. 1 when seen from above.

FIG. 3 is a schematic side view of the oscillation board in the clean zone in FIG. 1 when seen from a lateral direction.

FIG. 4 is a schematic side view illustrating a positional relationship among the oscillation board, the container for filling, and the particles in a clean zone in FIG. 1.

FIG. 5 is a schematic plan view illustrating a positional relationship between an oscillation board and a reflection board in a clean zone in a second embodiment when seen from above.

FIG. 6 is a schematic side view of the oscillation board and the reflection board in the clean zone in FIG. 5 when seen from a lateral direction.

FIG. 7 is a schematic plan view of a positional relationship of four oscillation boards in the clean zone in a third embodiment when seen from above.

FIG. 8 is a schematic side view of two oscillation boards faced with each other in the clean zone in FIG. 7 when seen from a lateral direction.

DETAILED DESCRIPTION

Each embodiment of a particle control method according to the present invention will be described by referring to the attached drawings.

First Embodiment

Figure 1:
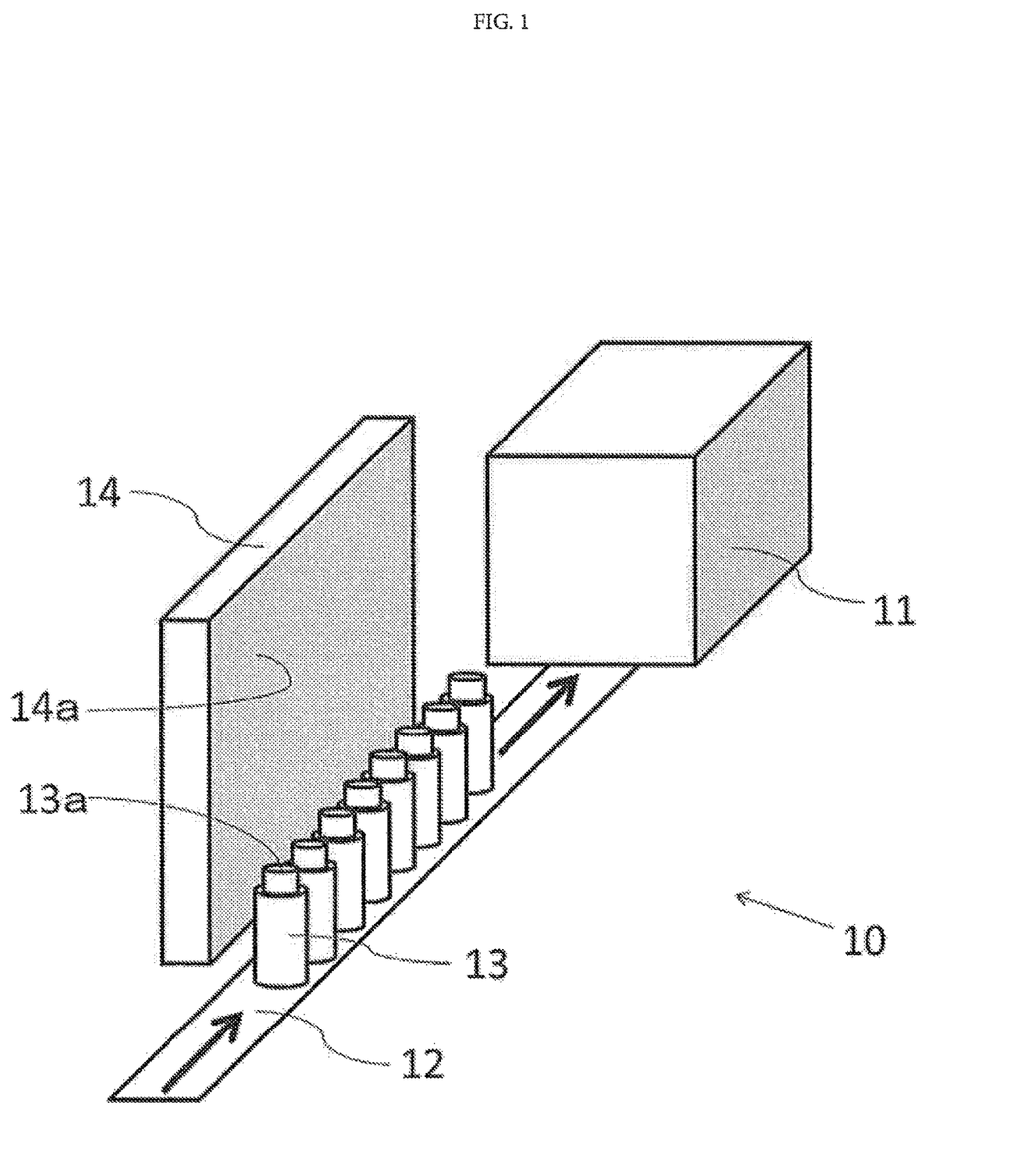

This first embodiment describes a particle control method in a state where a filling device of pharmaceutical products is disposed inside (clean zone) of an isolator device maintained at Grade A. FIG. 1 is a schematic perspective view illustrating a positional relationship between an oscillation board and a container for filling in a clean zone in this first embodiment. In FIG. 1, an inner wall surface of the isolator device constituting the clean zone is omitted.

In FIG. 1, in the clean zone 10, a filing device 11 of pharmaceutical products is disposed, and a conveyer 12 travels toward this filling device 11. On this conveyer 12, a plurality of containers for filling (vial bottles) 13 before filling of the pharmaceutical products are arrayed in one row and travel in a direction of the filling device 11. Above the container for filling 13 before filling, an opening portion 13a through which the pharmaceutical products are to be filled is provided. The container for filling 13 filled with the pharmaceutical products in the filling device 11 is sealed after that.

In this first embodiment, the filling device 11 disposed in the clean zone 10 is a general-purpose type device and can handle containers having various shapes. Moreover, by changing the filling device 11 to another model, a pharmaceutical filling process using diversified types of pharmaceuticals including liquid, powder, and particles and containers having various shapes corresponding to them can be set.

In FIG. 1, the dust-free/sterile state of the clean zone 10 is maintained at Grade A required for manufacture of pharmaceutical products and the like. In this first embodiment, an isolator device is used, and air suctioned by an air-feeding blower is purified by an HEPA filter of an air-feeding filter unit and forms a laminar flow going from an upper side toward a lower side in the clean zone 10. Moreover, the air on the lower side in the clean zone 10 is suctioned and discharged by an air-discharging blower through an outlet and an outlet filter.

In such environment, it is likely that particles each having a grain size of 0.5 µm or more are contained in the air at Grade A up to 3520 particles/m³ as an upper limit as described above. These particles also contain floating bacteria in the air. Therefore, even in the clean zone 10 in which Grade A is maintained, the particles present in the purified air and the floating bacteria contained in them linearly descend on the stream of the laminar flow from the upper side toward the lower side in the clean zone.

Thus, in FIG. 1, it is likely that the particles (including the floating bacteria) descending linearly from the upper side toward the lower side are mixed in the containers for filling 13 arrayed in one row and traveling on the conveyer 12 through the opening portions 13a. This first embodiment has an object to exclude the particles (including the floating bacteria) to be mixed in the container for filling 13 through the opening portion 13a as above.

For that purpose, in FIG. 1, an oscillation board 14 is provided on the side of the containers for filling 13 arrayed in one row. A board surface (oscillation surface) 14a of this oscillation board 14 is disposed substantially in parallel with a direction of the stream of the laminar flow (not shown) going from the upper side toward the lower side in the clean zone 10. Moreover, this board surface 14a is disposed in parallel with a traveling direction (a direction from lower left to upper right in illustration) of the plurality of containers for filing 13 arrayed in one row. Moreover, this board surface 14a is provided having a certain area in an upper direction and a width direction from the plurality of containers for filling 13 arrayed in one row. Moreover, a lower end portion of this board surface 14a is preferably provided at least from a position faced with the opening portion 13a to the lower side. When the plurality of containers for filling 13 arrayed in one row travel by changing its direction from a certain spot, a plurality of oscillation boards may be disposed in parallel with each of the traveling directions.

Here, the oscillation board 14 will be described. In the present invention, the oscillation board is not particularly limited as long as it has a board surface vibrated by ultrasonic wave and may be a plate-shaped oscillation board in which one or a plurality of piezoelectric vibrators which are ultrasonic vibrators are connected. Moreover, it may be a transducer in which the ultrasonic vibrators are two-dimensionally arrayed in a lattice state or the like or may be a speaker or the like corresponding to an ultrasonic zone. A frequency and an output of the generated ultrasonic wave only need to be within a range which can move the particles in the clean zone, and the frequency and the output may be variably operated. In this first embodiment, for example, an oscillation board in which a Langevin type vibrator is fixed to a stainless plate having a certain area is used.

Figure 2:
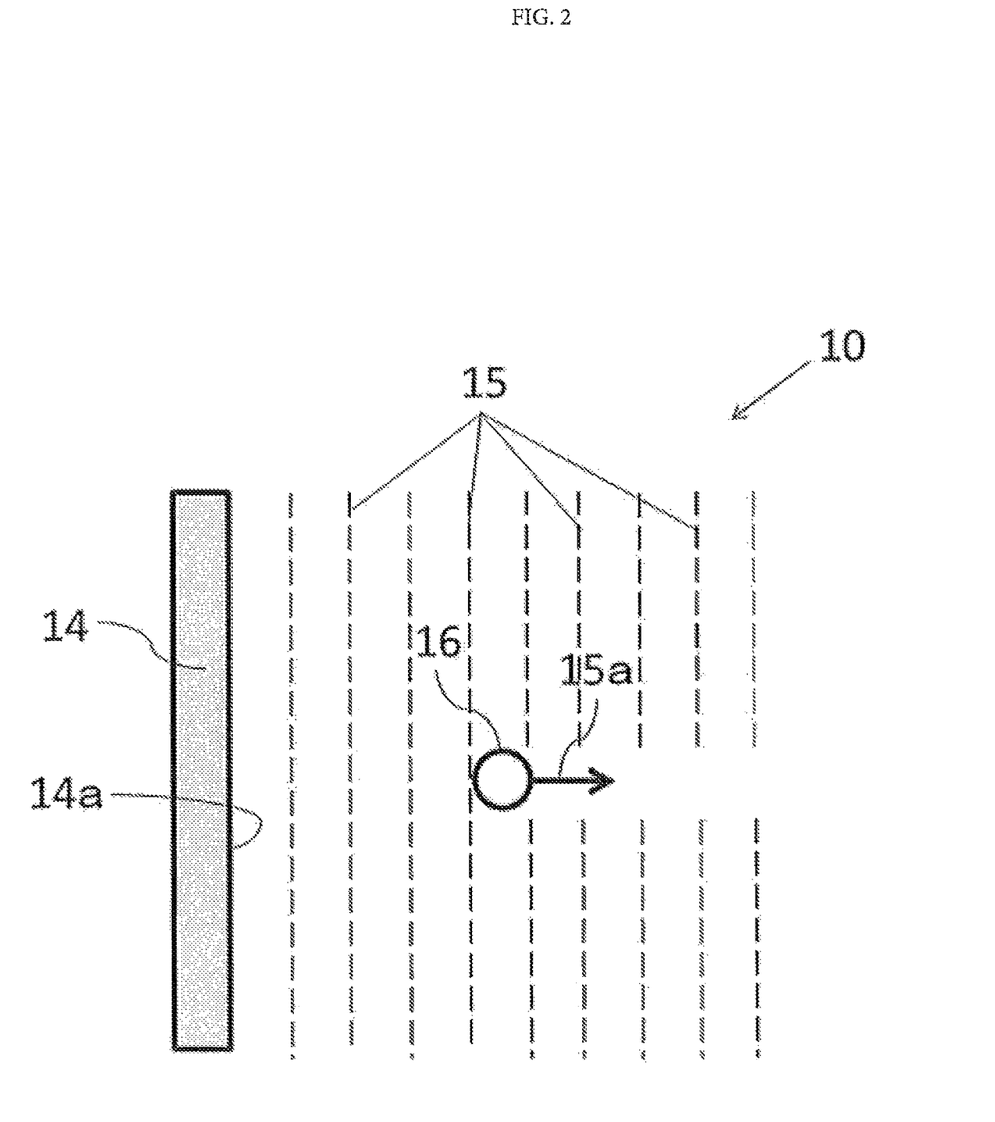

FIG. 2 is a schematic plan view of the oscillation board 14 in the clean zone 10 in FIG. 1 when seen from above. In FIG. 2, the inner wall surface of the isolator device, the filing device 11, the conveyer 12, and the container for filling 13 are omitted. In FIG. 2, when the oscillation board 14 is vibrated by ultrasonic wave, an acoustic flow 15 advancing in the air is generated in a perpendicular direction (right direction in illustration) from the board surface 14a. By shutting off this acoustic flow 15 by an object (a particle 16 in FIG. 2), a force pressing this particle 16 in a direction where the acoustic flow 15 flows (acoustic radiation pressure 15a) is generated. As a result, the acoustic radiation pressure 15a pushes the particle 16 in a direction (right direction in illustration) away from the board surface 14a of the oscillation board 14. In FIG. 2, since the particle 16 is seen from an upstream side toward a downstream side of the laminar flow, an action of the laminar flow is not illustrated.

Figure 3:
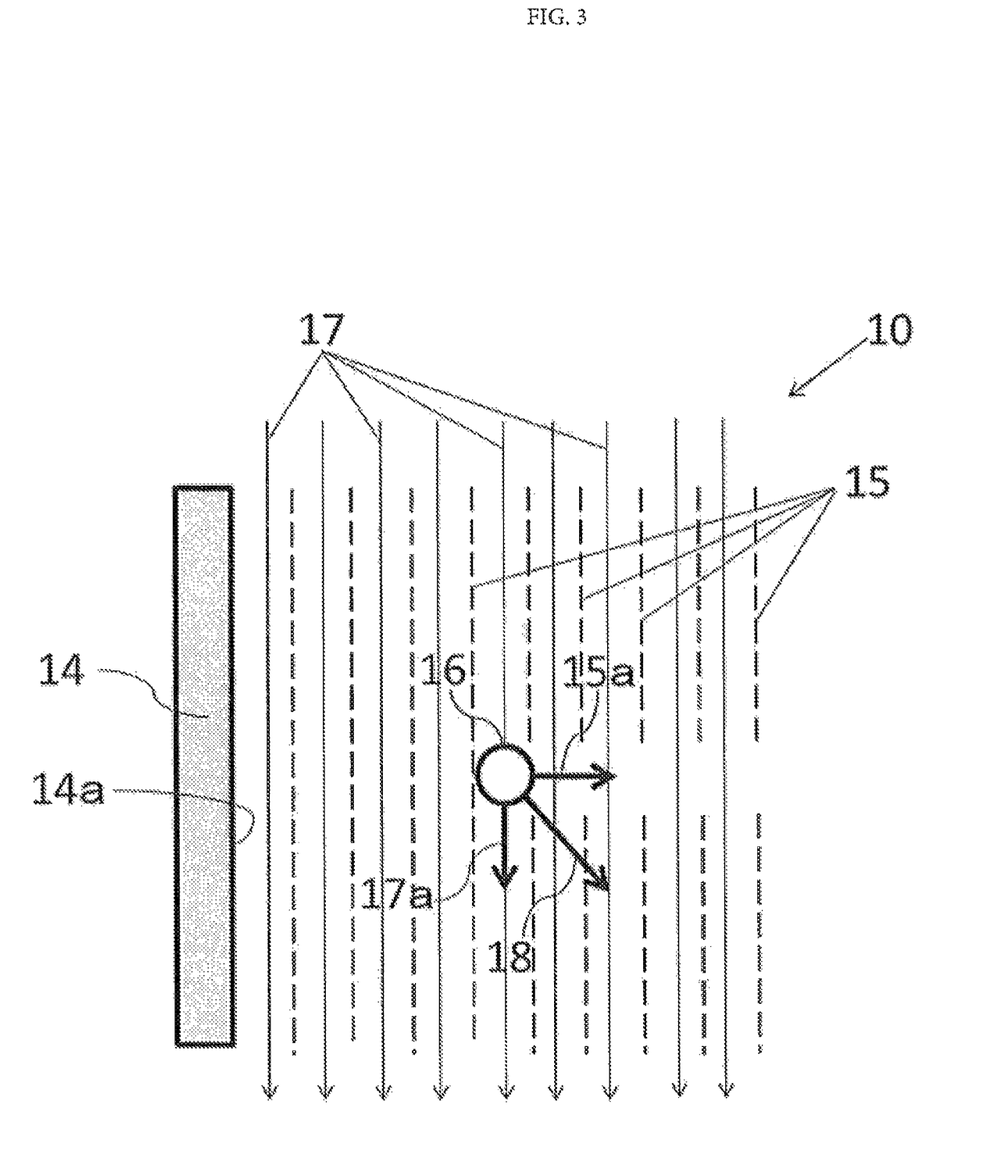

On the other hand, FIG. 3 is a schematic side view of the oscillation board 14 in the clean zone 10 in FIG. 1 when seen from a lateral direction. In FIG. 3, too, the inner wall surface of the isolator device, the filling device 11, the conveyer 12, and the container for filling 13 are omitted. In FIG. 3, when the oscillation board 14 is vibrated by ultrasonic wave, the acoustic flow 15 advancing in the air in the perpendicular direction (right direction in illustration) from the board surface 14a is generated. The acoustic radiation pressure 15a of this acoustic flow 15 acts on the particle 16 and pushes the particle 16 in the direction (right direction in illustration) away from the board surface 14a of the oscillation board 14.

Moreover, in FIG. 3, the laminar flow 17 traveling from the upper side toward the lower side flows through the clean zone 10. A pressing force (hereinafter referred to as a "fluid pressure 17a) by the stream of this laminar flow 17 acts on the particle 16 and pushes the particle 16 in a downstream direction (lower direction in illustration) of the laminar flow 17. As a result, the particle 16 in the clean zone 10 is pushed by actions of both the acoustic radiation pressure 15a by the oscillation board 14 and the fluid pressure 17a by the laminar flow 17 in a direction (lower right direction in illustration) of their resultant force 18.

Figure 4:
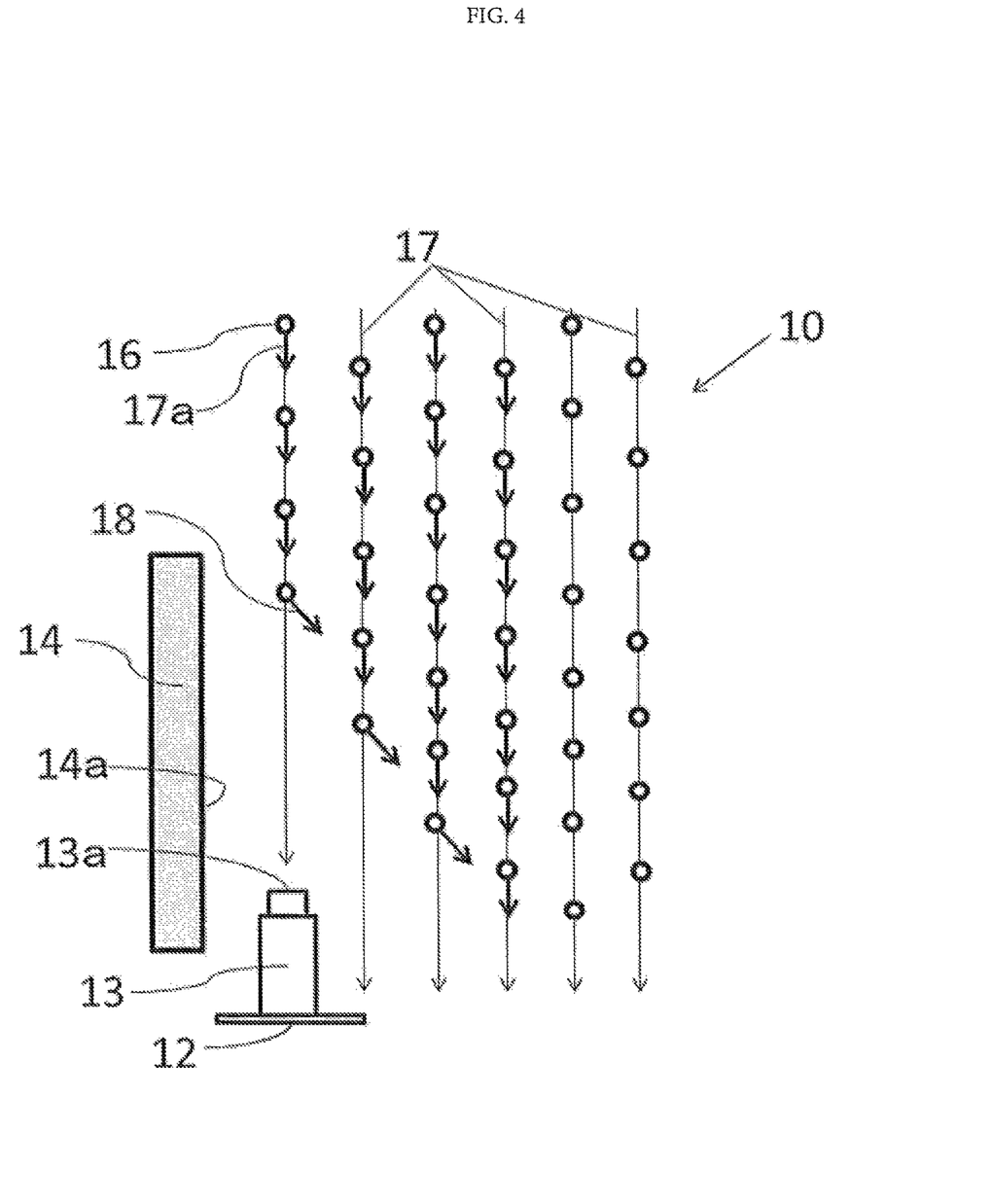

FIG. 4 is a schematic side view illustrating a positional relationship among the oscillation board, the container for filing, and the particle in the clean zone in FIG. 1. In FIG. 4, the inner wall surface of the isolator device, the filling device 11, and the acoustic flow 15 are omitted. In FIG. 4, the container for filling 13 is placed on the conveyer 12 traveling toward the filing device (not shown) in the clean zone 10. This container for filling 13 is in a state before the pharmaceutical product is filled, and its upper part is the opening portion 13a.

In FIG. 4, the oscillation board 14 is provided on the side of the container for filling 13. In FIG. 4, a side surface of the oscillation board 14 is drawn. The board surface 14a of this oscillation board 14 is disposed substantially in parallel with a direction of the stream of the laminar flow 17 traveling from the upper side toward the lower side in the clean zone 10. Moreover, this board surface 14a is disposed in parallel with the traveling direction (direction perpendicular to the figure) of the plurality of containers for filling 13 arrayed in one row. Moreover, this board surface 14a is provided having a certain area in the upper direction (vertical direction in the figure) and a width direction (direction perpendicular to the figure) of the plurality of containers for filing 13 arrayed in one row. Moreover, the lower end portion of this board surface 14a is provided to below the position faced with the opening portion 13a of the container for filling 13.

Here, above the position faced with the oscillation board 14, the particle 16 receives the action of the fluid pressure 17a of the laminar flow 17 and descends linearly. On the other hand, at the position faced with the oscillation board 14, the particle 16 receives the action of the acoustic radiation pressure 15a (not shown) by the oscillation board 14 together with the action of the fluid pressure 17a of the laminar flow 17 and descends in the direction (lower right direction in illustration) of their resultant force 18. As a result, the extremely small quantity of the particles (including the floating bacteria) present in the purified air at Grade A are not mixed in the container for filling 13 through the opening portion 13a.

Thus, according to this first embodiment, by controlling movement of the extremely small quantity of the particles descending on the stream of the laminar flow through the clean zone through which the laminar flow flows as in the RABS or isolator device, the particle control method which prevents particles from descending to a specific position such as the opening portion of the container for filling can be provided.

Second Embodiment

In this second embodiment, a particle control method when a dust-free state inside (clean zone) of an isolator device maintained at Grade A is measured by a particle counter will be described. Here, the particle counter is also called a particle measuring instrument and refers to a measuring instrument for counting dusts, particles, impurities and the like in the air. In measuring cleanliness in the clean zone, sample air sampled from the capturing port disposed in the clean zone is usually irradiated with a laser beam, and a size and the number of particles are measured from its light scattering intensity.

In this second embodiment, the laminar flow flows through the clean zone, and there is an extremely small quantity of particles descending linearly on the laminar flow from the upper side toward the lower side in the clean zone in the clean air supplied into the clean zone through the HEPA filter. On the other hand, the capturing port of the particle counter is opened with an extremely limited area on a downstream zone of the laminar flow. Therefore, by means of linear descent of the particles, the air supplied from immediately above the capturing port occupies the most of the sample air sampled from the capturing port. As a result, accurate measurement of cleanliness of the entire clean zone is difficult.

Thus, this second embodiment has an object to control movement of an extremely small quantity of particles linearly descending through the clean zone and to collect most of them at the capturing port of the particle counter for sampling. As a result, the cleanliness of the entire clean zone maintained at Grade A can be accurately grasped.

Figure 5:
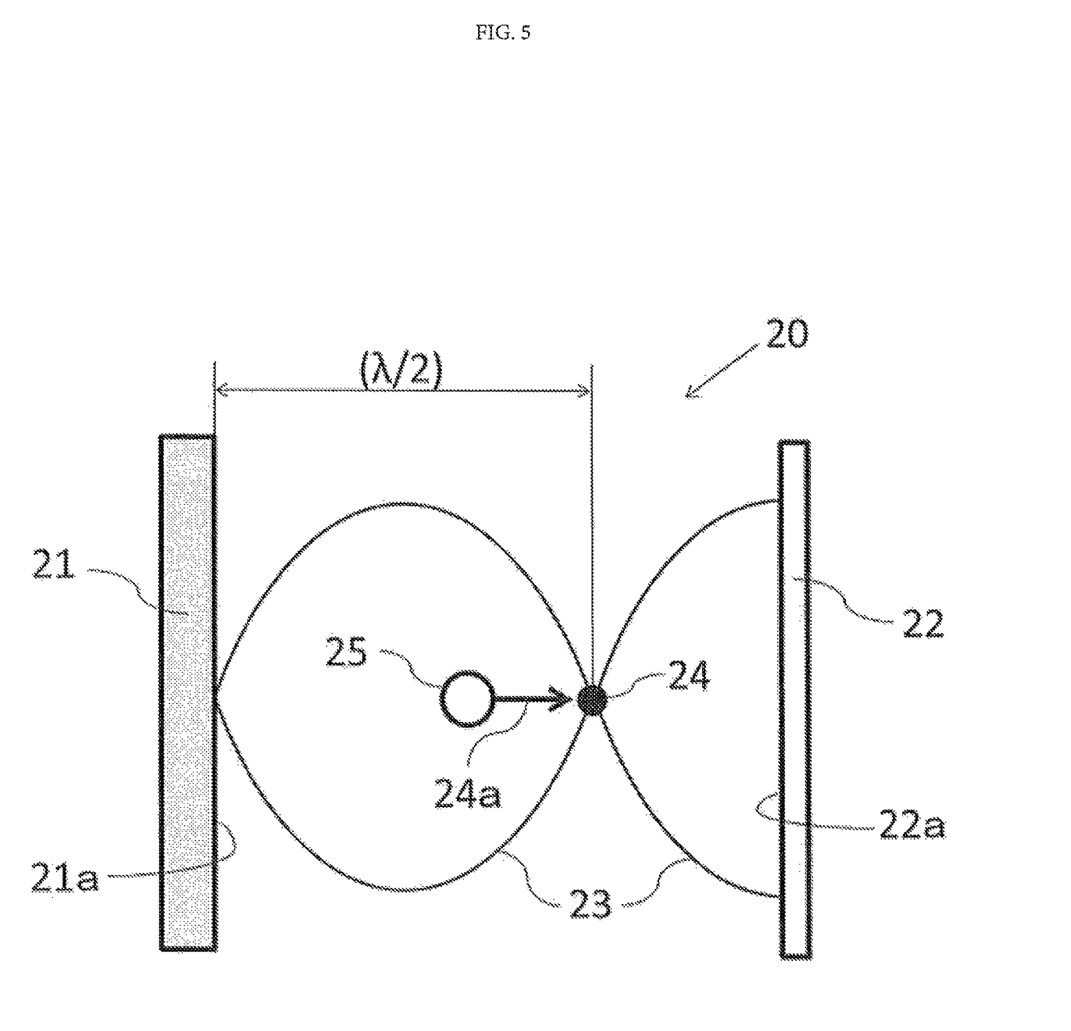

In this second embodiment, a pair of oscillation board and reflection board with their board surfaces faced with each other is disposed substantially in parallel with a flow direction of the laminar flow flowing from the upper side toward the lower side in the clean zone. FIG. 5 is a schematic plan view of a positional relationship between an oscillation board 21 and a reflection board 22 disposed in the clean zone 20 in this second embodiment when seen from above. In FIG. 5, the inner wall surface of the isolator device and the capturing port of the particle counter are omitted. In FIG. 5, the oscillation board 21 and the reflection board 22 are disposed in a state with their board surfaces opposed with each other.

Here, the oscillation board used in this second embodiment is not particularly limited and similarly to the first embodiment, it may be a plate-shaped oscillation board in which one or a plurality of piezoelectric vibrators which are ultrasonic vibrators are connected. Moreover, it may be a transducer in which the ultrasonic vibrators are two-dimensionally arrayed in a lattice state or the like or may be a speaker or the like corresponding to an ultrasonic zone. A frequency and an output of the generated ultrasonic wave only need to be within a range which can move the particles in the clean zone, and the frequency and the output may be variably operated. In this second embodiment, for example, an oscillation board in which a Langevin type vibrator is fixed to a stainless plate having a certain area is used. For the reflection board, a stainless plate having the same area as that of the oscillation board is used.

In FIG. 5, when the oscillation board 21 is subjected to ultrasonic vibration, a standing wave field 23 by the ultrasonic wave is generated between a board surface 21a of the oscillation board 21 and a board surface 22a of the reflection board 22 faced with each other in the perpendicular direction from each of the board surfaces and in a direction crossing the flow direction of the laminar flow. This standing wave field 23 is in a state obtained when an acoustic flow emitted perpendicularly from the oscillation board 21 to its board surface 21a hits and is reflected by the board surface 22a of the reflection board 22, an incident wave and a reflective wave are overlapped, and the wave does not move. In FIG. 5, the standing wave field 23 having a ¾ wavelength is generated between the board surface 21a of the oscillation board 21 and the board surface 22a of the reflection board 22. In FIG. 5, assuming the wavelength is $\lambda$, a half wavelength $\lambda/2$ is illustrated.

At a position of a node 24 of this standing wave field 23, an air pressure becomes low, and an article (a particle 25 in FIG. 5) present in the standing wave field 23 receives a guiding pressure 24a to a direction of the node 24 of the standing wave field 23. In FIG. 5, since the particle 25 is seen from an upstream side to a downstream side of the laminar flow, an action of the laminar flow is not illustrated.

Figure 6:
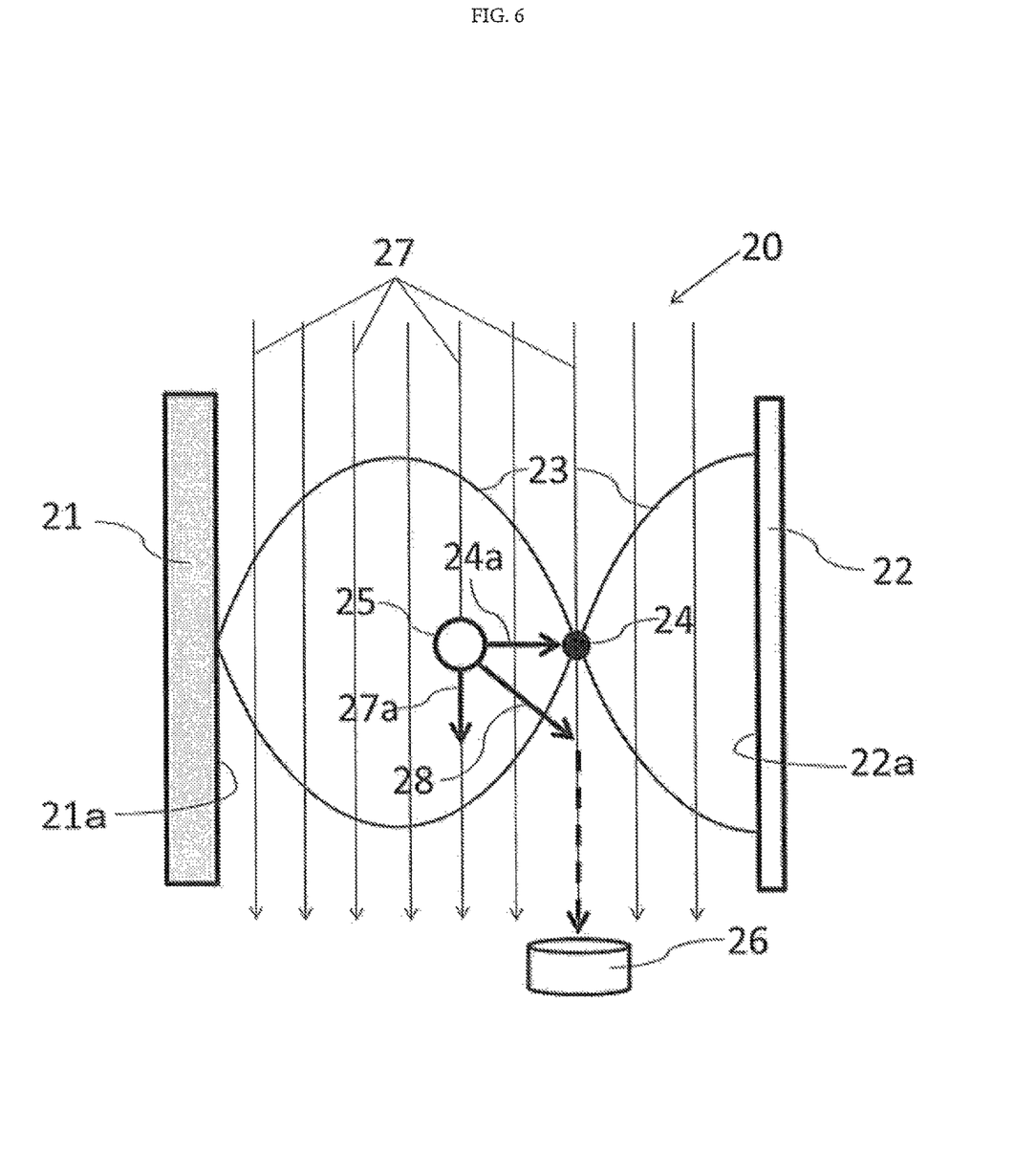

On the other hand, FIG. 6 is a schematic side view of the oscillation board 21 and the reflection board 22 in the clean zone 20 in FIG. 5 when seen from a lateral direction. In FIG. 6, the inner wall surface of the isolator device is omitted. In FIG. 6, a capturing port 26a of the particle counter 26 is illustrated on the downstream side of a laminar flow 27. In FIG. 6, when the oscillation board 21 is subjected to ultrasonic vibration, the standing wave field 23 is generated between the oscillation board 21 and the reflection board 22 as described above, and the particle 25 receives the guiding pressure 24a to the direction of the node 24 of the standing wave field 23.

Moreover, in FIG. 6, the laminar flow 27 flows through the clean zone 20 from the upper side toward the lower side. A pressing force (hereinafter referred to as a "fluid pressure 27a") by the flow of this laminar flow 27 acts on the particle 25 and pushes the particle 25 to the downstream direction (lower direction in illustration) of the laminar flow 27. As a result, the particle 25 present in the standing wave field 23 is pushed by actions of both the guiding pressure 24a to the direction of the node 24 of the standing wave field 23 and the fluid pressure 27a by the laminar flow 27 in a direction (lower right direction in illustration) of their resultant force 28.

The particle 25 having reached below the node 24 of the standing wave field 23 is captured by the capturing port 26a of the particle counter 26 opened below the node 24 by the action of the fluid pressure 27a by the laminar flow 27 without being affected by the standing wave field 23 after that. If there is a plurality of the nodes 24 of the standing wave field 23, the capturing ports 26a of the particle counters 26 are preferably provided below each of the nodes 24, respectively.

As described above, by controlling movement of the particles present in an extremely small quantity in the clean air at Grade A, most of them can be collected in the capturing port 26a of the particle counter 26 and sampled. As a result, cleanliness of the entire clean zone maintained at Grade A can be grasped more accurately.

Thus, according to this second embodiment, by controlling movement of the extremely small quantity of the particles descending on the stream of the laminar flow through the clean zone through which the laminar flow flows as in the RABS or isolator device, the particle control method which guides particles so as to descend to a specific position such as the capturing port of the particle counter can be provided.

Third Embodiment

In this third embodiment, a particle control method when the floating bacteria contained in the particles present in an extremely small quantity inside (clean zone) of the isolator device maintained at Grade A are counted by a floating bacteria counter will be described. In this third embodiment below, even if it is described simply as a "particle", it is assumed to refer to the "particles including floating bacteria".

Here, the floating bacteria counter refers to a measuring instrument for counting the floating bacteria contained in dusts or particles in the air similarly to the particle counter in the second embodiment. Particularly, in this third embodiment, a floating bacteria counter used in Rapid Microbiological Methods (RMM) is employed. In order to measure the floating bacteria in the clean zone by using this floating bacteria counter, sample air sampled from the capturing port disposed in the clean zone is usually irradiated with a laser excited fluorescence (LIF), and a size and the number of floating bacteria are measured by detecting auto-light emission by a constituent component of the floating bacteria. Not only measurement of the floating bacteria but a function of the particle counter in the second embodiment may be also provided so as to measure both the floating particles and floating bacteria.

In this third embodiment, the laminar flow is flowing through the clean zone, and in the clean air supplied into the clean zone through the HEPA filter, an extremely small quantity of the particles descending linearly on the stream of the laminar flow from the upper side toward the lower side in the clean zone is present. On the other hand, the capturing port of the floating bacteria counter is opened with an extremely limited area on a downstream zone of the laminar flow. Therefore, by means of linear descent of the particles, the air sampled from the capturing port occupies the most of the air supplied from immediately above the capturing port. As a result, accurate measurement of sterile state of the entire clean zone is difficult.

Thus, this third embodiment has an object to control movement of an extremely small quantity of particles linearly descending through the clean zone and to collect most of them at the capturing port of the floating bacteria counter for sampling. As a result, the cleanliness of the entire clean zone maintained at Grade A can be grasped more accurately.

Figure 7:
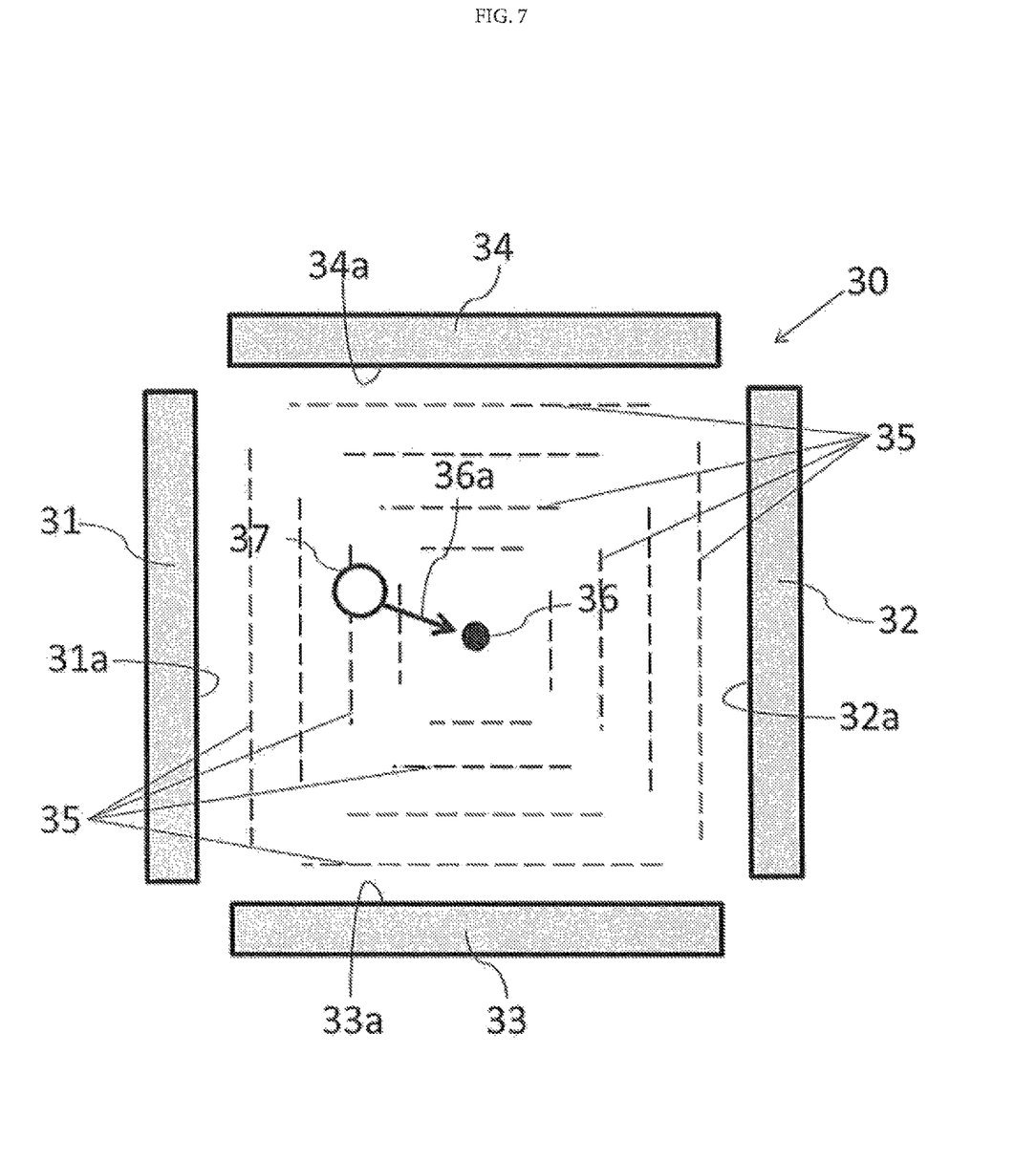

In this third embodiment, two oscillation boards with their board surfaces faced with each other are disposed as a pair substantially in parallel with the flow direction of the laminar flow flowing from the upper side toward the lower side in the clean zone, and another pair of oscillation boards crossing it substantially at a right angle are disposed in a horizontal direction, that is, four oscillation boards in total are disposed. FIG. 7 is a schematic plan view of a positional relationship of the four oscillation boards 31, 32, 33, and 34 disposed in the clean zone 30 in this third embodiment when seen from above. In FIG. 7, the inner wall surface of the isolator device and the capturing port of the floating bacteria counter are omitted.

In FIG. 7, the two oscillation boards 31 and 32 are disposed in a state where their board surfaces 31a and 32a are faced with each other. Moreover, the two oscillation boards 33 and 34 have their board surfaces 33a and 34a faced with each other and are disposed in a state substantially at a right angle to the board surfaces 31a and 32a of the oscillation boards 31 and 32. As a result, the clean zone 30 is in a state surrounded in four directions by the board surfaces 31a, 32a, 33a, and 34a of the four oscillation boards 31, 32, 33, and 34.

Here, the oscillation boards used in this third embodiment are not particularly limited and similarly to the first embodiment, it may be a plate-shaped oscillation board in which one or a plurality of piezoelectric vibrators which are ultrasonic vibrators are connected. Moreover, it may be a transducer in which the ultrasonic vibrators are two-dimensionally arrayed in a lattice state or the like or may be a speaker or the like corresponding to an ultrasonic zone. A frequency and an output of the generated ultrasonic wave only need to be within a range which can move the particles in the clean zone, and the frequency and the output may be variably operated. In this third embodiment, for example, an oscillation board in which a Langevin type vibrator is fixed to a stainless plate having a certain area is used.

In FIG. 7, when the four oscillation boards 31, 32, 33, and 34 are subjected to ultrasonic vibration, a focal point 36 of the ultrasonic wave is generated between each of the board surfaces in a perpendicular direction from each board surface and in a direction crossing the flow direction of the laminar flow by an acoustic flow 35 from each oscillation board.

When the focal point 36 of the ultrasonic wave is generated as above, an article (a particle 37 in FIG. 7) present between each of the board surfaces receives a guiding pressure 36a in a direction of the focal point 36 of the ultrasonic wave. In FIG. 7, since the particle 37 is seen from the upstream side toward the downstream side of the laminar flow, an action of the laminar flow is not illustrated.

Figure 8:
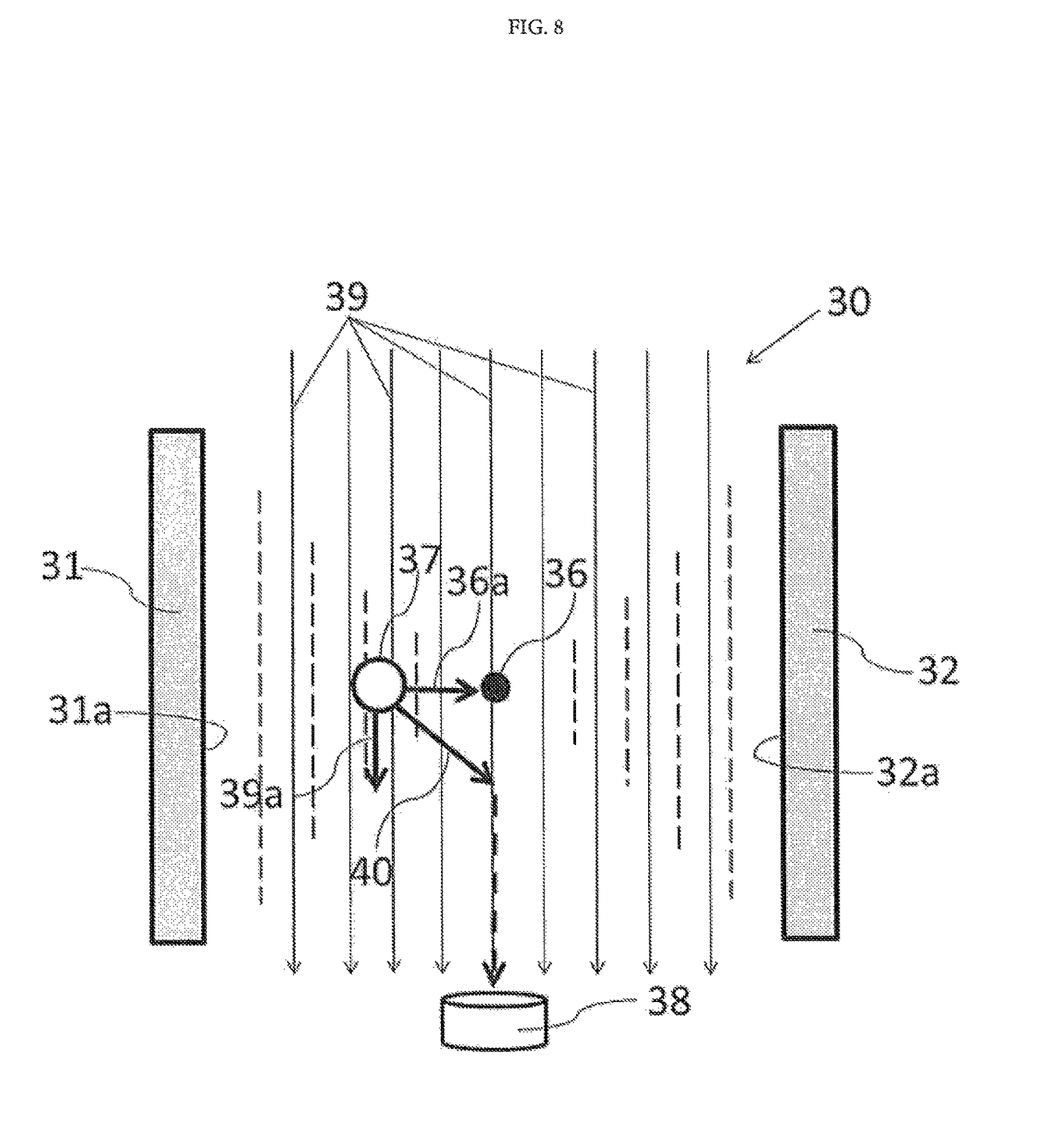

On the other hand, FIG. 8 is a schematic side view of the two opposing oscillation boards 31 and 32 in the clean zone 30 in FIG. 7 when seen from a lateral direction. In FIG. 8, the oscillation boards 33 and 34 and the inner wall surface of the isolator device are omitted. In FIG. 8, a capturing port 38a of a floating bacteria counter 38 is illustrated on the downstream side of a laminar flow 39. In FIG. 8, when the oscillation boards 31, 32, 33, and 34 are subjected to ultrasonic vibration, the focal point 36 of the ultrasonic wave is generated between each of the board surfaces as described above, and the particle 37 receives a guiding pressure 36a to the direction of the focal point 36 of the ultrasonic wave.

Moreover, in FIG. 8, the laminar flow 39 flows through the clean zone 30 from the upper side toward the lower side. A pressing force (hereinafter referred to as a "fluid pressure 39a") by the flow of this laminar flow 39 acts on the particle 37 and pushes the particle 37 to the downstream direction (lower direction in illustration) of the laminar flow 39. As a result, the particle 37 present between each of the board surfaces is pushed by actions of both the guiding pressure 36a to the direction of the focal point 36 of the ultrasonic wave and the fluid pressure 39a by the laminar flow 39 in a direction (lower right direction in illustration) of their resultant force 40.

The particle 37 having reached below the focal point 36 of the ultrasonic wave is captured by the capturing port 38a of the floating bacteria counter 38 opened below the focal point 36 of the ultrasonic wave by the action of the fluid pressure 39a by the laminar flow 39 without being affected by the focal point 36 of the ultrasonic wave after that.

As described above, by controlling movement of the particles present in an extremely small quantity in the clean air at Grade A, most of them can be collected in the capturing port 38a of the floating bacteria counter 38 and sampled. As a result, cleanliness of the entire clean zone maintained at Grade A can be grasped more accurately.

Thus, according to this third embodiment, by controlling movement of the extremely small quantity of the particles (including floating bacteria) descending on the stream of the laminar flow through the clean zone through which the laminar flow flows as in the RABS or isolator device, the particle control method which can guide it so as to descend to a specific position such as the capturing port of the floating bacteria counter can be provided.

In putting the present invention into practice, not limited to each of the aforementioned embodiments, various variations as below can be cited:

(1) In each of the aforementioned embodiments, the isolator device is used as a highly clean environment. However, this is not limiting, and a highly clean environment by RABS (restricted-access barrier system) or a highly clean environment equivalent to that may be used.

(2) In each of the aforementioned embodiments, the oscillation board is disposed in the clean environment in the isolator device. However, this is not limiting, and the inner wall surface of the isolator device may be subjected to ultrasonic vibration as the oscillation board.

(3) In each of the aforementioned embodiments, a Langevin type vibrator fixed to a stainless plate having a certain area is used as the oscillation board. However, this is not limiting, and any oscillation board may be used as long as it has a board surface subjected to ultrasonic vibration.

(4) In the first embodiment, one oscillation board is used. However, this is not limiting, and a plurality of oscillation boards may be used in directions so that board surfaces are crossed.

(5) In the second embodiment, one oscillation board and one reflection board with their board surfaces faced with each other are used. However, this is not limiting, and two oscillation boards with their board surfaces faced with each other may be used as a pair.

(6) In the second embodiment, the node of the standing wave field is used as a particle counter. However, this is not limiting, and the node of the standing wave field may be used for the floating bacteria counter.

(7) In the second embodiment, the node of the standing wave field is fixed above the capturing port of the particle counter. However, this is not limiting, and the node of the standing wave field may be moved to above the capturing port of the particle counter or the floating bacteria counter while a frequency of the ultrasonic vibration is modulated.

(8) In the third embodiment, two pairs of oscillation boards are used, one pair being two oscillation boards with their board surfaces faced with each other. However, this is not limiting, and two pairs or three pairs or more of oscillation boards may be used.

(9) In the third embodiment, the focal point of the ultrasonic wave is used for the floating bacteria counter. However, this is not limiting, and a focal point of the ultrasonic wave may be used for the particle counter.

(10) In the third embodiment, the focal point of the ultrasonic wave is fixed above the capturing port of the floating bacteria counter. However, this is not limiting, and the focal point of the ultrasonic wave may be moved to above the capturing port of the particle counter or the floating bacteria counter while a frequency and an output of the ultrasonic vibration of each oscillation board are modulated.

LIST OF REFERENCE NUMERALS 10, 20, 30 clean environment,
11 filling device, 12 conveyer, 13 container for filling, 13a opening portion, 14, 21, 31, 32, 33, 34 oscillation board, 22 reflection board,
14a, 21a, 22a, 31a, 32a, 33a, 34a board surface,
15, 35 acoustic flow, 15a acoustic radiation pressure,
16, 25, 37 particle,
17, 27, 39 laminar flow, 17a, 27a, 39a fluid pressure,
18, 28, 40 resultant force,
23 standing wave field, 24 node of standing wave field, 36 focal point of ultrasonic wave
24a, 36a guiding pressure,
26 particle counter, 26a capturing ort of particle counter,
38 floating bacteria counter, 38a capturing port of floating bacteria counter

The invention claimed is:

1. A method for controlling a movement of particles the method comprising:
providing a work chamber that is configured to operate as a clean zone through which a unidirectional air flow flows vertically from a higher level in the work chamber to a lower level of the work chamber;
in said clean zone, containing a pair of boards having their board surfaces face each other in parallel with the flow direction of the unidirectional air flow, wherein the pair of boards includes an oscillation board disposed in one plane only, and
a reflection board or an auxiliary oscillation board:
subjecting the oscillation board to an ultrasonic vibration so as to generate an acoustic flow by an ultrasonic wave in a direction perpendicular to the surface of oscillation board and in a direction crossing the flow direction of the unidirectional air flow;
operating the oscillation board to have the ultrasonic wave to interact with the particles in the unidirectional air flow that are descending from the higher level to the lower level
to subject the particles to a pressing force by the ultrasonic wave so that a descent position of a chosen particle from said descending particles is controlled in a direction away from the surface of the oscillation board,
by prompting ultrasonic vibration of the pair of boards, generating a standing wave field by the ultrasonic wave in said direction that is perpendicular to the surface of the oscillation board and that is crossing the flow direction of the unidirectional air flow;
subjecting the particles in the unidirectional air flow to the ultrasonic wave to guide the particles to a node of the standing wave field to control the descent position to below a position of the node of the standing wave field.

2. The method according to claim 1, comprising:
changing the position of the node of the standing wave by relatively changing an output of the ultrasonic vibration of each board from the pair of boards to shift the descent position in an arbitrary direction.

3. The method according to claim 1, comprising:
opening a capturing port of a counter configured as a particle counter or a floating bacteria counter located in the working chamber below the position of the node of the standing wave field and controlling a movement of targets that include said particles or aid floating bacteria contained in the unidirectional air flow to guide said targets to the capturing port, and
measuring an amount of targets captured by the counter.

4. A method for controlling a movement of particles
the method comprising:
providing a work chamber that is configured to operate as a clean zone through which a unidirectional air flow flows vertically from a higher level in the work chamber to a lower level of the work chamber;
in said clean zone, containing a first pair of boards parallel with the flow direction of the unidirectional air flow and having their board surfaces facing each other along a first axis, and an additional pair of boards in parallel with the flow direction of the unidirectional air flow, and having corresponding board surfaces each other along a second axis that is transverse to the first axis in a horizontal plane,
wherein each of the first and additional pairs of boards includes
a corresponding oscillation board disposed in one plane only, and
a corresponding reflection board or a corresponding auxiliary oscillation board:
subjecting an oscillation board of each of the first and additional pairs of boards to an ultrasonic vibration so as to generate an acoustic flow by an ultrasonic wave in a direction perpendicular to a surface of said oscillation board and in a direction crossing the flow direction of the unidirectional air flow;
operating the oscillation board to have the ultrasonic wave to interact with the particles in the unidirectional air flow that are descending from the higher level to the lower level
to subject the particles to a pressing force by the ultrasonic wave so that a descent position of a chosen particle from said descending particles is controlled in a direction away from the surface of the oscillation board;
by prompting ultrasonic vibrations of said first and additional pairs of boards, forming a focal point of ultrasonic wave on an axis perpendicular to board surfaces and crossing the flow direction of the unidirectional air flow; and
subjecting the particles in the unidirectional air flow to the ultrasonic wave to guide the particles to the focal point of the ultrasonic wave to control the descent position to below a position of the focal point of the ultrasonic wave.

5. The method according to claim 4, comprising:
changing the position of the focal point of the ultrasonic wave by relatively changing an output of corresponding ultrasonic vibration of each of the oscillation boards to shift the descent position in an arbitrary direction.

6. The method according to claim 4,
opening a capturing port of a counter configured as a particle counter or a floating bacteria counter located in the working chamber below a position of the focal point of the ultrasonic wave and controlling a movement of targets that include said particles or floating bacteria contained in the unidirectional air flow to guide said targets to the capturing port, and
measuring an amount of targets captured by the counter.

* * * * *